Figure 7:
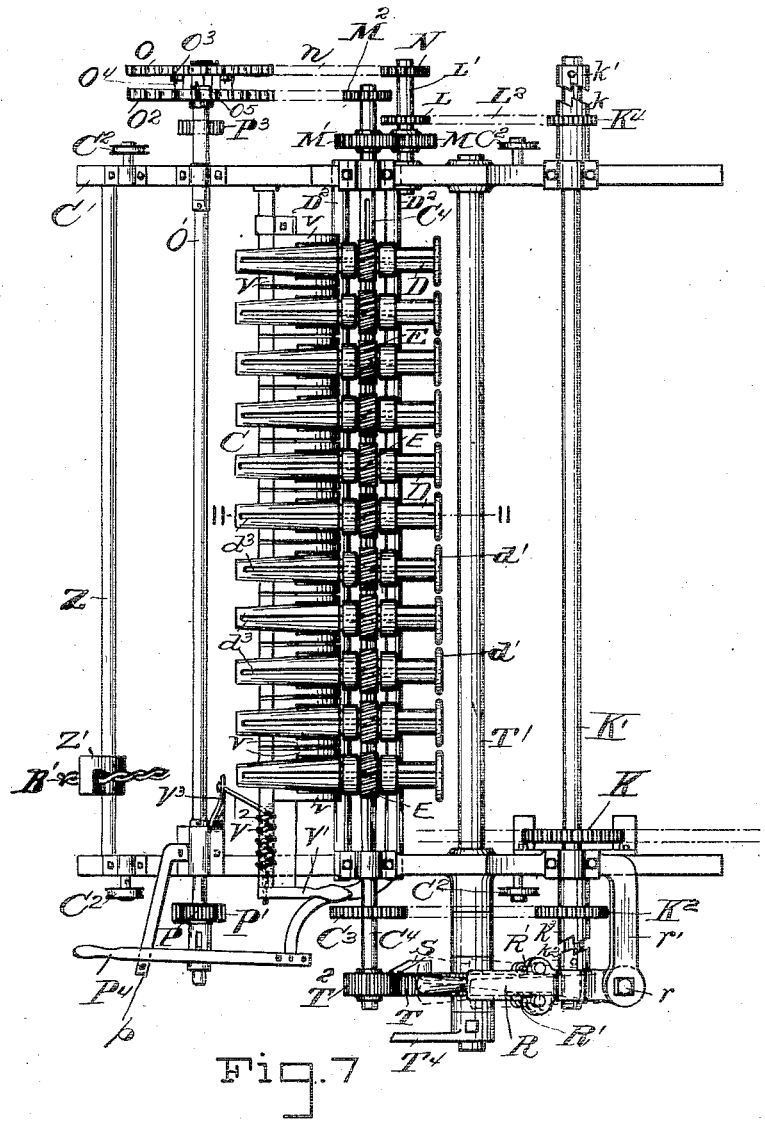

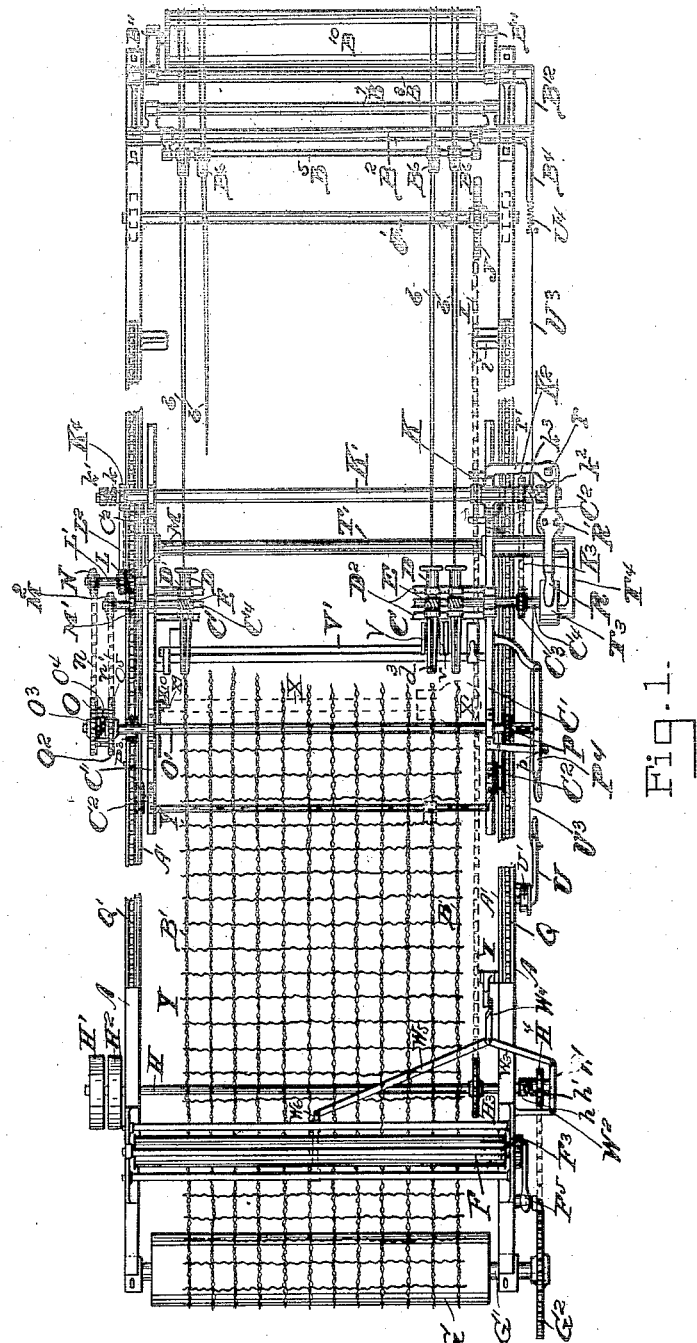

J. S. BARNES.
WIRE FENCE MACHINE.
APPLICATION FILED JAN. 20, 1913.
1,084,125.
Patented Jan. 13, 1914.
9 SHEETS—SHEET 2.
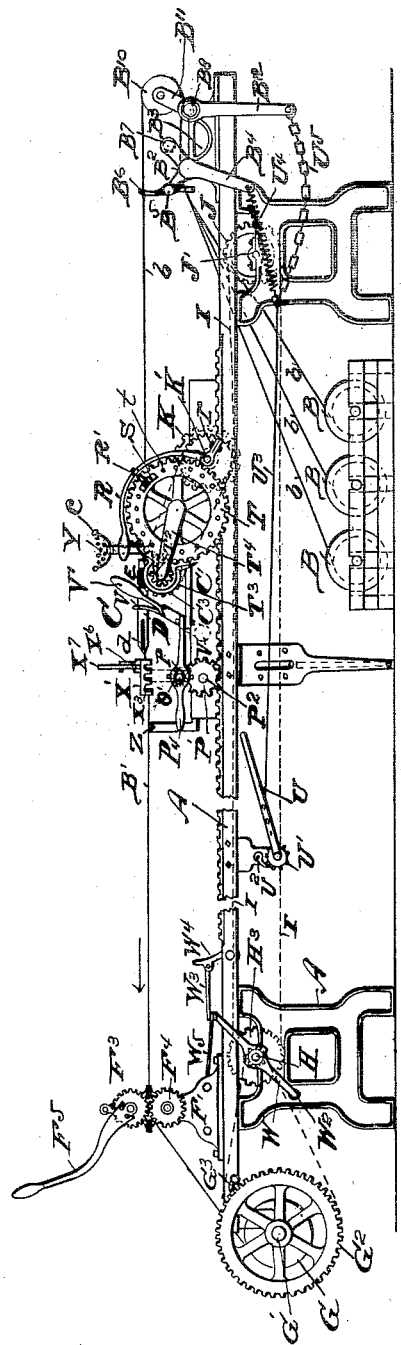
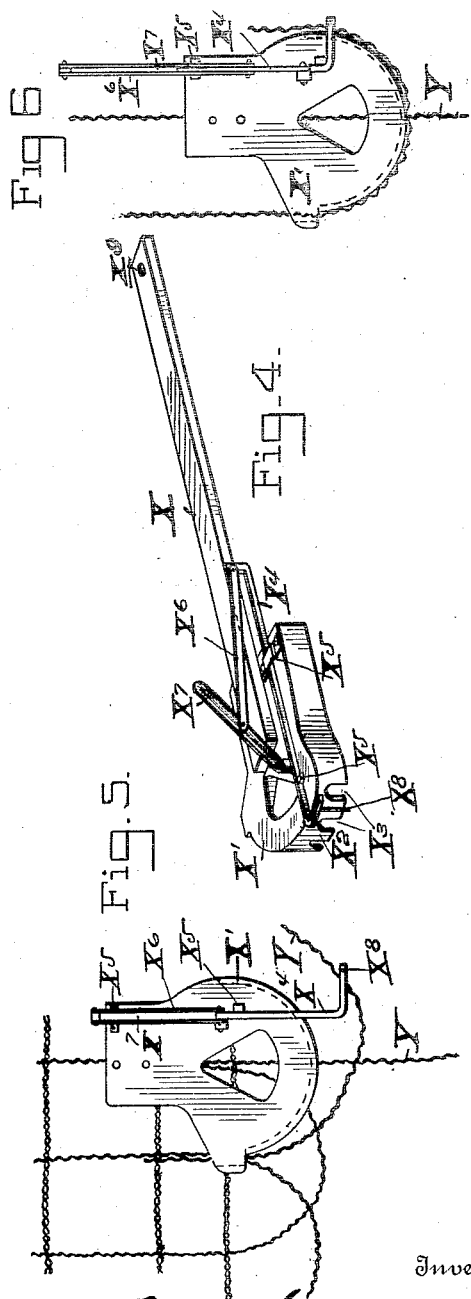

J. S. BARNES.
WIRE FENCE MACHINE.
APPLICATION FILED JAN. 20, 1913.
1,084,125.
Patented Jan. 13, 1914.
9 SHEETS—SHEET 3.
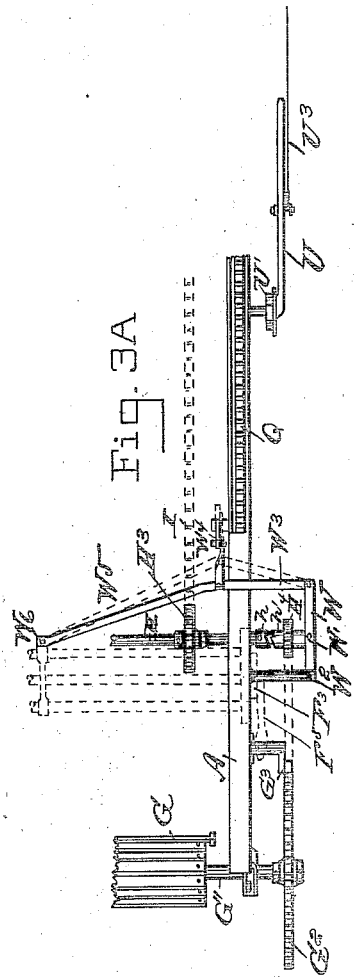
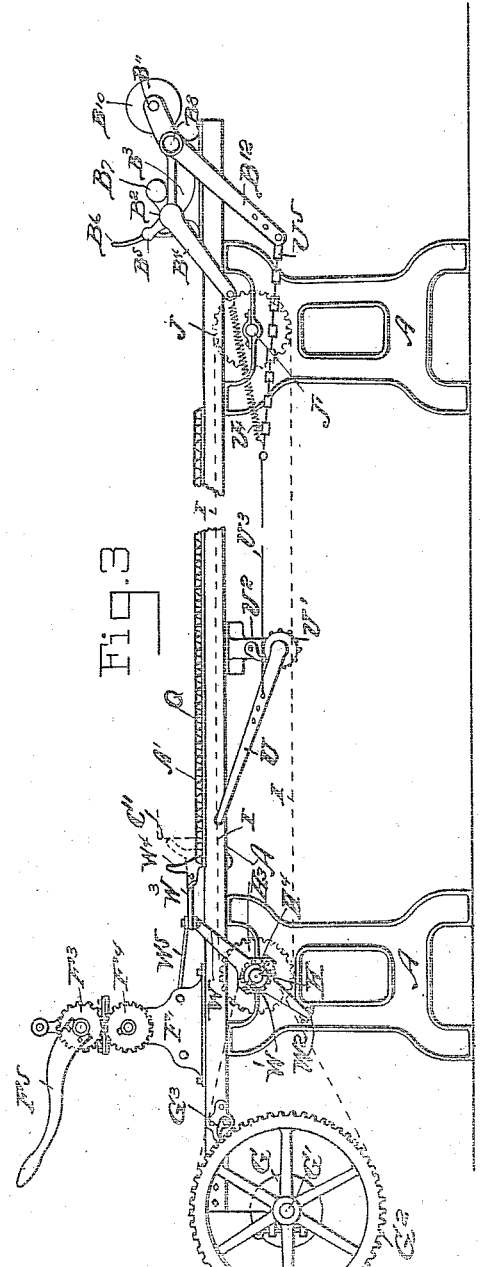

J. S. BARNES.
WIRE FENCE MACHINE.
APPLICATION FILED JAN. 20, 1913.
1,084,125.
Patented Jan. 13, 1914.
9 SHEETS—SHEET 5.
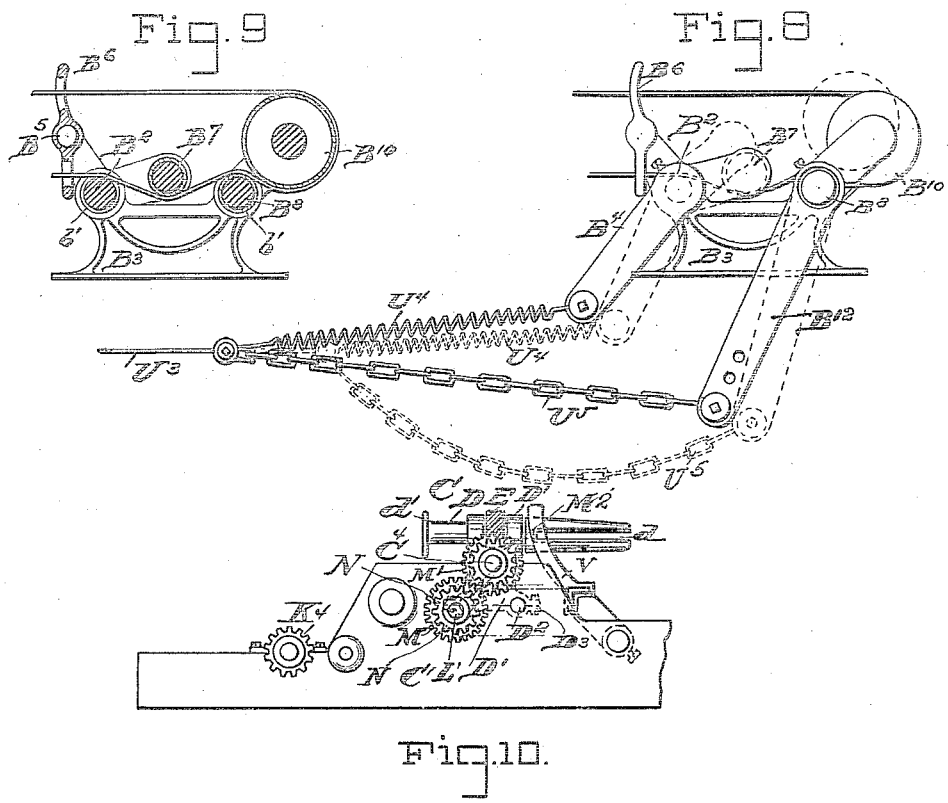
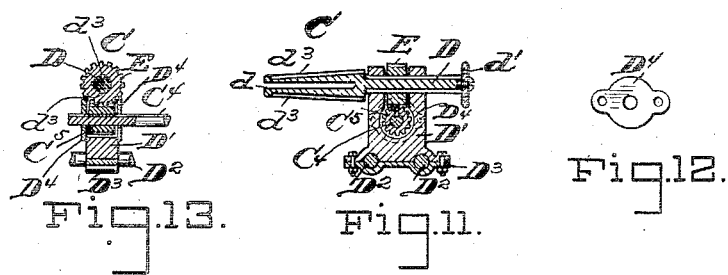
Witnesses
M. D. Feldtrappe
Grace E. Wynkoop
Inventor
John S. Barnes
By J. B. Thomas
Attorney J. S. BARNES.
WIRE FENCE MACHINE.
APPLICATION FILED JAN. 20, 1913.
1,084,125.
Patented Jan. 13, 1914.
9 SHEETS—SHEET 6.
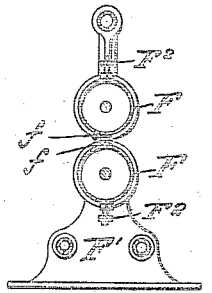
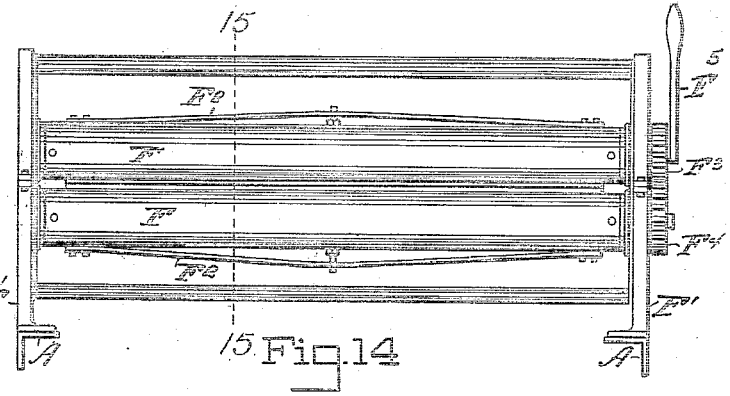
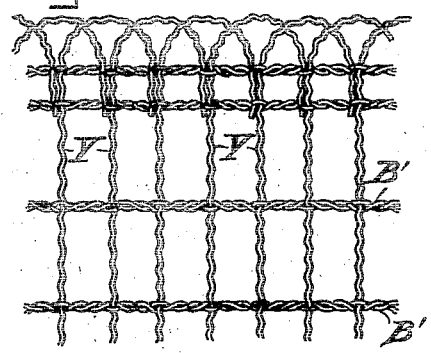
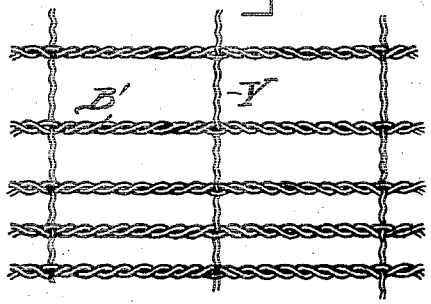
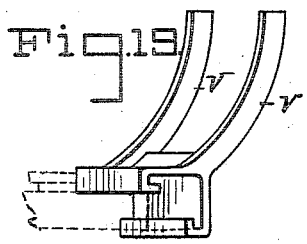
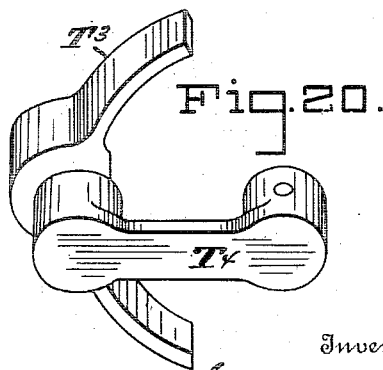
Witnesses
Inventor
John S. Barnes
By J. S. Thomas
Attorney J. S. BARNES.
WIRE FENCE MACHINE.
APPLICATION FILED JAN. 20, 1913.
1,084,125.
Patented Jan. 13, 1914.
9 SHEETS—SHEET 7.
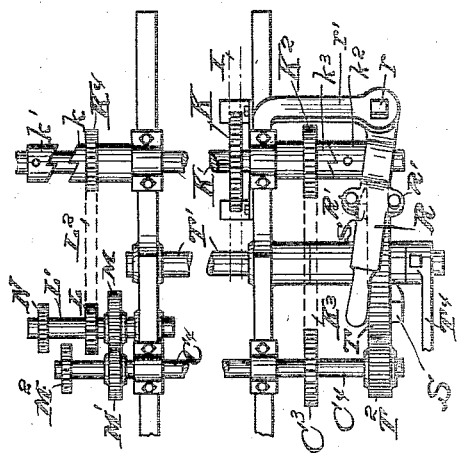
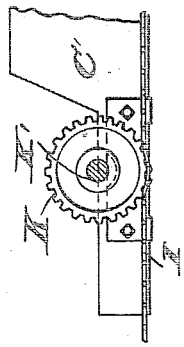
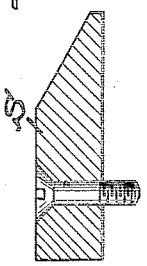
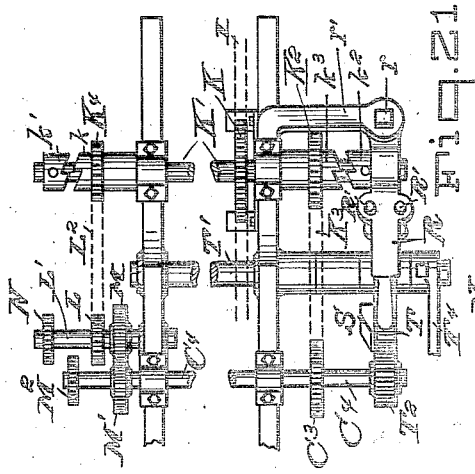
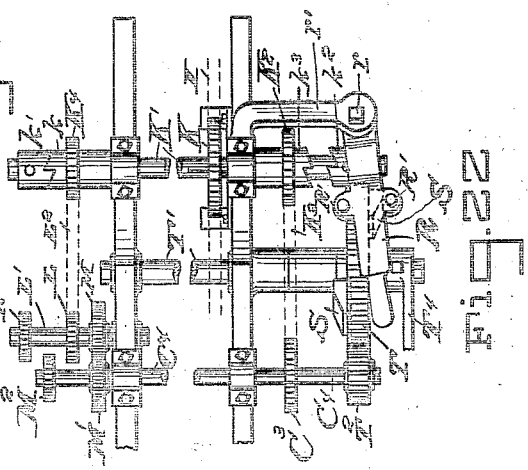

J. S. BARNES.
WIRE FENCE MACHINE.
APPLICATION FILED JAN. 20, 1913.

1,084,125.

Patented Jan. 13, 1914.
9 SHEETS—SHEET 9.

UNITED STATES PATENT OFFICE.

JOHN S. BARNES, OF DETROIT, MICHIGAN.

WIRE-FENCE MACHINE.

1,084,125.   Specification of Letters Patent.   Patented Jan. 13, 1914.

Application filed January 20, 1913. Serial No. 743,033.

*To all whom it may concern:*

Be it known that I, JOHN S. BARNES, citizen of the United States, residing at Detroit, county of Wayne, State of Michigan, have invented a certain new and useful Improvement in Wire-Fence Machines, and declare the following to be a full, clear, and exact description of the same, such as will enable others skilled in the art to which it pertains to make and use the same, reference being had to the accompanying drawings, which form a part of this specification.

My invention relates to fence machines and is more particularly an improvement of the type shown in the United States Patent No. 847,721, issued to me on the 19th day of March, 1907, in which an extended section of the strands forming the line wires of a fence are first put under tension preparatory to the insertion of the pickets.

One of the objects of the present invention is an improvement in the general construction of the machine in which means are provided for operating the same by power in place of the manual operation required by the former construction.

Another feature of the invention is the means employed for putting under tension an extended section of the strands forming the line wires preparatory to the insertion of the pickets.

Another feature is the means employed to twist the lateral wires of a cable between the pickets and means for reversing the twist upon the insertion of each picket.

Another feature is the adjustable means employed whereby the pickets may be spaced at a predetermined distance, the twisting of the lateral wires stopping automatically for the insertion of the picket at a predetermined interval.

Another feature of the invention is the dragging grip and the means for releasing the same.

Another feature is the means employed to return the twisting carriage to its initial position to form another section of fence upon the completion of the fence fabric under tension.

Another feature is the means for arresting the return movement of the carriage upon reaching its initial position.

Another feature is the means governing the bundling of the finished product.

Another feature is the means devised for inserting and forming an arched top picket.

Other advantages and improvements will hereafter appear.

Figure 16:
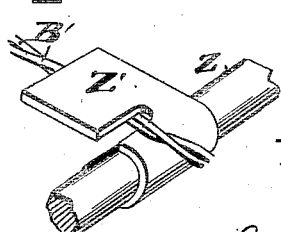
Figure 26:
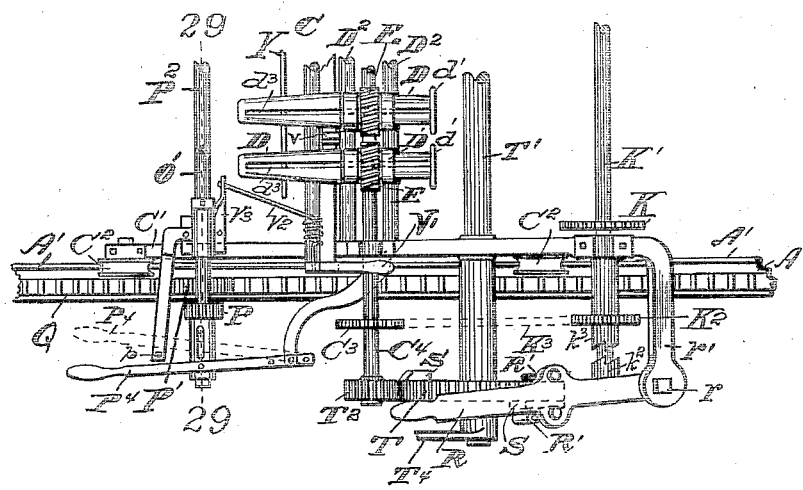
Figure 27:
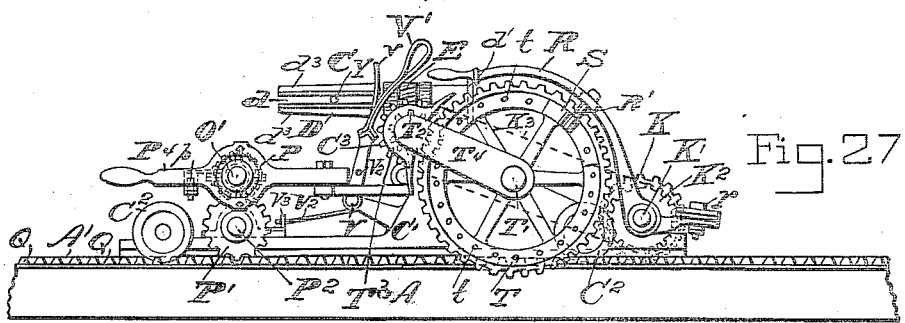
Figure 28:
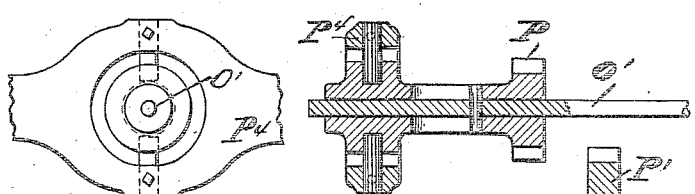
Figure 29:
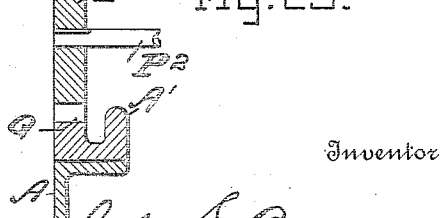
Figure 30:
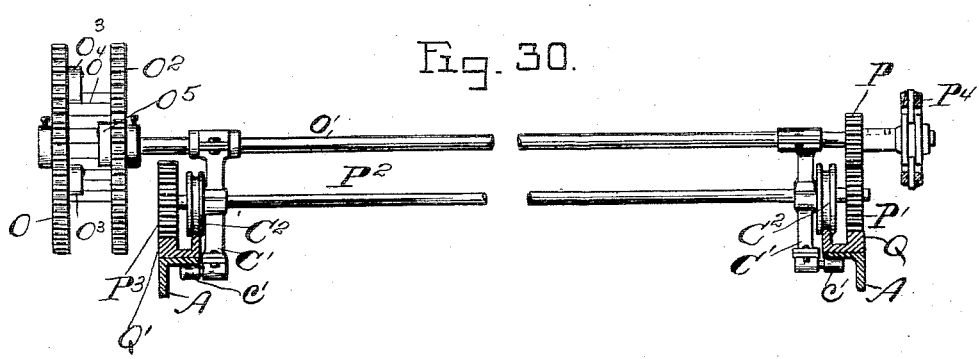
Figure 31:
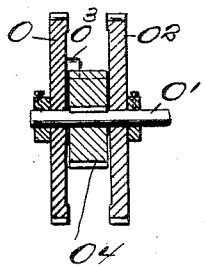
Figure 32:
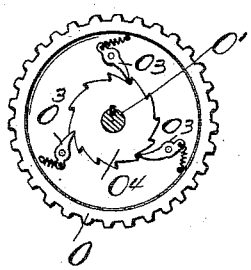
Figure 33:
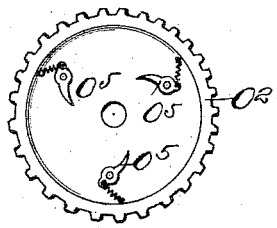

In the drawings accompanying this specification: Figure 1 is a plan view of the machine with parts broken away, indicating in dotted lines the location of the attachment employed for forming and inserting the arched top pickets. Fig. 2 is a side elevation of the machine with parts broken away, showing the dragging grip released. Fig. 3 is a side elevation of the extreme ends of the machine—the intermediate portion being broken away and the traveling carriage removed—showing the dragging grip engaged. Fig. 3ᴬ is a plan view of a fragmentary detail indicating the means employed for stopping the carriage carrying the twisting gears upon its return to its initial position preparatory to twisting the strands of the next succeeding section of the line wires put under tension. Fig. 4 is a detail perspective view of the means employed for constructing an arched top picket and for securing the end of the picket while it is being engaged between the strands forming the lateral cables. Fig. 5 is a detail plan view of the part shown in Fig. 4, in the act of forming the arched top of one of the pickets. Fig. 6 is a similar view indicating the arched top of the picket completely formed and in position to be engaged between the strands of the lateral cables. Fig. 7 is a plan view of the twisting gears and carriage. Fig. 8 is an end elevation of an enlarged detail indicating the means employed to produce a dragging grip on the lateral cables and in dotted lines its released position. Fig. 9 is a cross-sectional view through the same disclosing the manner of threading the lateral wires between the gripping rolls with the tension on. Fig. 10 is a fragmentary side elevation of the twisting gear carriage, with the "beater" for forcing the picket into the crotch,—formed by the strands of the lateral cables,—in its initial position. Fig. 11 is a cross-sectional view on line 11—11 of Fig. 7, of one of the twisting gears and arbor,—the gear for actuating the same and the adjustable bracket in which they are housed. Fig. 12 is an elevation of the plate attached to each end of the several twisting gear brackets shown in dotted lines in Fig. 11. Fig. 13 is a detail cross-sectional view through one of the twisting gears and its supporting bracket, view of the frame of the machine showing in elevation the rolls employed for rigidly gripping the line wires. Fig. 15 is a cross-section through the gripping mechanism on line 15—15 of Fig. 14. Fig. 16 is a perspective view of the device attached to one of the lateral wires and to the twisting gear carriage to drag the latter back to its initial position when the completed section of fence is bundled upon the winding drum. Fig. 17 is a detail view of a lawn fence fabric manufactured by the machine. Fig. 18 is a detail view of a farm fence,—the product of the machine. Fig. 19 is a perspective view of one of the "beaters," the part employed for manually forcing the picket into the crotch formed by the strands of the line wires preparatory to twisting the latter around the picket. Fig. 20 is a detail perspective view of the guard housing the pinion for operating the twisting gears. Fig. 21 is a detail plan view with parts broken away, of the clutch mechanism controlling the twisting of the line wires about the pickets, the parts being at rest. Fig. 22 is a similar view showing the position of the clutch mechanism on the far side of the machine, as forced into engagement by a cam controlling the same. Fig. 23 is a similar detail indicating the clutch as engaged on the near side of the machine due to the action of another cam for controlling the same. Fig. 24 is a detail view of the main driving sprocket journaled in the frame of the traveling carriage, indicating the manner of maintaining the driving sprocket chain in operative engagement therewith. Fig. 25 is a sectional view of one of the adjustable cams referred to in the description of Figs. 21, 22, and 23, by which the clutch mechanisms on either side of the machine are automatically and alternately forced out of operation. Fig. 26 is a plan view of a fragmentary portion of the machine including a portion of the twisting gear carriage. Fig. 27 is a side elevation of the parts disclosed in Fig. 26. Fig. 28 is a fragmentary elevation of the shifting lever P$^4$ indicating the manner of engaging it with the hub of the gear P leaving it free to rotate while providing for its being shifted laterally by manual operation. Fig. 29 is a detail sectional view on line 29—29 of Fig. 26, of the gear which meshes with the horizontal rack bar of the frame—by which the twisting gear carriage is caused to travel—the pinion for driving said gear being forced out of mesh by the manual lever controlling same. Fig. 30 is a cross-sectional view at the end of the traveling carriage, showing the manner of driving the rack gears,—in mesh with the rack bars carried by the supporting frame of the machine. Fig. 31 is a cross-sectional view through the sprocket wheels O and O$^2$ loosely mounted upon the shaft O', and the ratchet wheel—keyed to the shaft—actuated by dogs carried by the respective sprocket wheels. Fig. 32 is an elevation of one of the sprocket wheels and its dogs and the ratchet wheel operated thereby. Fig. 33 is an elevation of the opposing sprocket wheel and its dogs for engaging the ratchet wheel.

Referring now to the letters of reference placed upon the drawings: A indicates the frame of the machine; B spools of wire suitably supported in a convenient frame beneath the machine.

$b$ denotes strands of wire forming the lateral cables B'.

B$^2$ is a rock shaft journaled in a suitable bracket B$^3$ in turn mounted upon the frame of the machine.

B$^4$ is a bell crank lever mounted on the rock shaft B$^2$.

B$^5$ is a bar supported by suitable arms projecting from the shaft B$^2$, and B$^6$ are slotted guides mounted on said bar through which respectively pass the several strands of wire $b$.

B$^7$ is a swinging roll carried by the bell crank lever.

B$^8$ is a roll journaled in the bracket B$^3$.

$b'$, $b'$, are sleeves mounted on the rock shaft B$^2$ and roll B$^8$.

B$^{10}$ indicates a weighted roll carried by the rocker arms B$^{11}$ in turn supported by the shaft B$^8$.

B$^{12}$ is a swinging lever secured to the shaft B$^8$ for operating the rocker arm B$^{11}$.

After passing through slots in the lower portion of the guides B$^6$, the strands of wire are threaded over the roll B$^2$, under the roll B$^7$, over the roll B$^8$ and partially around the roll B$^{10}$, thence back through the slots provided in the upper portion of the guides B$^6$ to the twisting mechanism C,—each pair of strands forming the lateral cables lying adjacent to each other throughout. The twisting mechanism C is mounted in a movable carriage C' provided with grooved wheels C$^2$ in turn traveling on a rib or track A' forming part of the frame of the machine.

$c$ is a receptacle mounted on the traveling carriage to receive the pickets prior to their insertion between the strands of the lateral cables.

$c'$ are rolls journaled in the carriage bearing against the under face of the side members of the frame A to insure against lifting or displacement of the carriage when in operation.

E indicates a plurality of spiral gears severally mounted on arbors D in turn journaled in laterally adjustable brackets D'.

D$^2$ are transverse bars forming part of the frame of the movable carriage C' to which the brackets D' are engaged by means of clip plates $D^3$, bolted thereto,—it being obvious that upon releasing the bolts the brackets carrying the several arbors may be spaced apart as required.

$D^4$ are plates sleeved on the shaft $C^4$ secured to each side of the several brackets to house the gears $C^5$.

$d$ are slots formed in the arbors D to receive the pickets one by one which are then introduced successively between the strands of the lateral cables forming the fence by an adjustable swinging "beater" pivoted to the frame of the carriage $C'$.

$d'$ indicate disks or flanges secured to the end of the arbors and perforated for the passage of the strands of wire forming the lateral cables, the flanges serving as "spreaders" to keep the strands apart adjacent to the carriage to avoid entanglement therewith.

$d^3$ are oppositely disposed grooves formed in the periphery of the arbors to receive the strands of the lateral cables.

F are a pair of gripping rolls journaled in brackets $F'$ in turn mounted upon the frame A of the machine.

$f, f$, are strips forming longitudinal ribs respectively secured to the rolls between which the strands $b$ are threaded.

$F^2$ indicate truss rods engaging the rolls to stiffen the latter.

$F^3, F^4$, are gears meshing together and mounted on the ends of the rolls F, and $F^5$ is a lever attached to the gear $F^3$ for actuating the rolls.

G is a winding drum mounted on the shaft $G'$ in turn journaled in the frame of the machine.

$G^2$ is a sprocket wheel keyed to the shaft $G'$, and $G^3$ is a dog engaging the sprocket wheel to govern its return movement. The ends of the lateral cables are secured to the winding drum by a suitable clamping device (not shown).

H is a driving shaft journaled in the frame of the machine on which are mounted tight and loose pulleys $H'$ and $H^2$.

$H^3$ is a sprocket gear keyed to the shaft H.

$h$ is one member of a clutch carried by the shaft H, adapted to co-act with the connecting clutch member $h'$.

$H^4$ is a sprocket gear carried by the clutch member $h'$ connected by sprocket chain with the sprocket gear $G^2$.

I is a sprocket chain driven by sprocket wheel $H^3$ extending to and meshing with the sprocket wheel J keyed to the shaft $J'$ journaled in the frame at the opposite end of the machine.

$i$ are chain supporting brackets (which may be provided with anti-friction rolls) secured to the frame of the machine to relieve the sprocket wheels of the weight of the chain.

K is a sprocket gear mounted on the laterally movable shaft $K'$ in turn journaled in the traveling carriage $C'$,—the sprocket gear K being driven by the chain I.

$k$ and $k'$ are co-acting members of the clutch carried by the shaft $K'$ on the far side of the machine—the member $k$ being loose on the shaft and the member $k'$ pinned to the shaft. $k^2$ and $k^3$ are similar clutch members carried by the shaft $K'$ on the near side of the machine—the member $k^2$ being pinned to the shaft and the member $k^3$ loose upon the shaft.

$K^2$ is a sprocket wheel carried by the shaft $K'$.

$C^3$ is a sprocket wheel mounted on the shaft $C^4$ journaled in the frame of the twisting gear carriage.

$C^5$ are spiral gears keyed to the shaft $C^4$ severally in mesh with the spiral gears E in turn keyed to the arbors D.

$K^3$ is a sprocket chain engaging the sprocket wheel $C^3$ and driven by the sprocket wheel $K^2$ on the shaft $K'$.

$K^4$ is a sprocket wheel carried by the shaft $K'$ on the far side of the machine.

L is a sprocket wheel mounted on the stub shaft $L'$ supported in the frame of the traveling carriage.

$L^2$ is a sprocket chain engaging the sprocket wheel L and driven by the sprocket wheel $K^4$.

M is a spur gear keyed to the shaft $L'$ in turn meshing with a gear $M'$ mounted on the shaft $C^4$.

N is a sprocket wheel mounted on the end of the stub shaft $L'$ connected by a sprocket chain $n$ with the sprocket wheel O, loosely mounted on the shaft $O'$ journaled in the traveling carriage frame.

$M^2$ is a sprocket wheel keyed on the shaft $C^4$ connected by a sprocket chain $n'$ with the sprocket wheel $O^2$ loosely mounted on the shaft $O'$.

$O^3$ are dogs pivoted to the sprocket wheel O engaging a ratchet wheel $O^4$ keyed to the shaft $O'$, and $O^5$ are dogs pivoted to the sprocket wheel $O^2$ which also engages the ratchet wheel $O^4$.

P is a laterally slidable pinion on the shaft $O'$ (see near side of the machine) which in turn drives the gear wheel $P'$ on the shaft $P^2$ lying directly below the shaft $O'$. The gear $P'$ on the near side of the machine and gear $P^3$ on the far side of the machine, in turn mesh with the rack bars Q and $Q'$ mounted on the frame A of the machine—see Fig. 30.

It will now be obvious that upon the rotation of the shaft $P^2$, the gears $P'$ and $P^3$ engaging the rack bars Q and $Q'$, will cause the carriage $C'$ to move to the right—its further operation being hereinafter more fully explained.

P⁴ is a lever pivoted to the frame of the carriage engaging the hub of the laterally movable pinion P upon the operation of which the pinion may be forced out of mesh with the gear P'.

$p$ is a removable pin to secure the lever against accidental displacement when the pinion P and gear P' are in mesh.

R is a lever pivoted at $r$ to a projecting bracket $r'$ carried by the traveling carriage.

R', R', are antifriction rolls spaced apart and secured to the lever R adapted to engage the adjustable cams S, S, respectively secured to opposite sides of the gear wheel T,—mounted on the shaft T', in turn journaled in the carriage frame.

T² is a pinion mounted on the shaft C⁴ which meshes with and drives the gear wheel T.

T³ is a guard covering the pinion T² supported upon an arm T⁴ on the end of the shaft T'.

The lever R is engaged with the shaft K' to which, as previously indicated, is pinned one member $k'$ and $k^2$ of the clutches located at each end of the shaft which the cams S, S, carried by the gear wheel T, alternately actuate except when the lever R is manually set at a neutral position; namely, with both clutches out of locking engagement.

U denotes a lever on the end of the rock shaft supported in a bracket depending from the frame of the machine, carrying a ratchet wheel U' engaged by a dog U².

U³ is a cable connected at one end to the lever, the other end of which is secured to the spring U⁴ in turn engaged with the bell crank B⁴.

U⁵ is a chain engaged with the cable U³ at one end and at the other end with the swinging lever B¹².

V is a rock shaft journaled in the frame of the traveling carriage carrying a plurality of laterally adjustable fingers $v$ spaced apart to accommodate between them the projecting ends of the arbors D,—the fingers being adapted to engage the pickets as they are lodged in the slot of the arbors and force the same out into the crotch formed by the strands of the wires forming the lateral cables.

V' is a rocker arm secured to the end of the shaft V and V² is a spring secured at one end to a bracket V³ carried by the frame of the traveling carriage; the other end of the spring engaging the rocker arm V' to return the shaft to initial position.

W is a shifting arm pinned at W' to the member $h'$ of the clutch carried by the shaft H and pivoted at W² to a bracket projecting from the frame of the machine.

W³ is a bar pivoted to the other end of the shifting arm W, the opposite end of the bar being connected with an upstanding tripping lever W⁴ pivoted to the frame of the machine.

W⁵ is a link bar pivoted at one end to the arm W and at W⁶ to a cross member of the frame.

X is a bar, to one end of which is secured an arc-shaped casting X' having a downwardly projecting flange X² slotted at X³ to accommodate the pickets Y.

X⁴ is a hooked-shaped sliding bar retained by suitable keepers X⁵ secured to the casting X'.

X⁶ is a link pivoted at one end to the hooked bar X⁴ and at the other with the lever X⁷ in turn pivoted to a projecting lug carried by the casting X'.

X⁸ is a depending pin carried by the hooked bar X⁴ designed to engage the end of the picket Y upon the operation of the lever X⁷ which serves to bend it to conform to the arc-shaped head of the casting X'.

X⁹ is an aperture formed in the opposite end of the bar X to receive a projecting hook or other suitable engaging device X¹⁰, carried by the frame of the traveling carriage.

Z is a supporting bar carried by the traveling carriage on which the lateral wires rest and Z' is a clip adapted to engage the bar Z and one of the lateral cables B' of the fence,—the object being, upon the completion of a predetermined length of fence fabric, to secure the carriage to one of the lateral cables of the fence upon the completion of the section of fence prior to winding the same upon the bundling drum in order that the carriage may be returned to its initial position ready to form a new section of fence following the bundling of the finished product.

Having indicated the several parts by reference letters, the construction of the machine and its operation will be readily understood. As previously stated, the strands forming the lateral cables are first led from the several spools in pairs through the lower portion of the slotted guides B⁶, over the roll B², under the roll B⁷ and partially around the roll B¹⁰ back through the upper portion of the slotted guides B⁶,—the rolls B⁷ and B¹⁰ being tilted upwardly as indicated in Fig. 2, to provide for the free passage of the wires in threading up the machine. From the upper portion of the slotted guides B⁶ the strands pass in pairs through the several oppositely arranged apertures in the respective spreaders $d'$ attached to the end of each of the arbors D; thence through the grooves in the latter to the gripping rolls F, F, which are first rotated by the lever F⁵, to permit of the strands passing freely between the rolls to the winding drum G, to which they are secured by a suitable clamping device. The lever $F^5$ is then operated to partially rotate the gripping rolls;—the strips $f$, $f$, attached thereto, gripping and holding the several strands. The lever U to which is secured the end of the operating cable $U^3$ connected by a spring $U^4$ with the bell crank lever $B^4$, is then manually shifted to the left as indicated in Fig. 3, causing the roll $B^7$ to swing into contact with the several strands to apply a dragging grip upon the latter—see Figs. 8 and 9. At the same time the chain $U^5$ connected with the swinging lever $B^{12}$, causes the roll $B^{10}$ carried by the rocker arm $B^{11}$, to swing downward taking up the slack of the cables between the gripping rolls F, F, and the dragging grip $B^7$, thereby putting the several strands under tension. The movable carriage $C'$ is then moved to the end of the rack bar Q directly in front of the gripping rolls F, and the lever $P^4$ operated forcing the pinion P in mesh with the gear $P'$. The pin $p$ is then inserted in the supporting bracket to secure the lever from accidental movement which might result in throwing the gears out of mesh. The lever R is then adjusted to either the position indicated in Fig. 22 or that shown in Fig. 23, and for purposes of description, it will be assumed that it is first adjusted to the position indicated in the former figure. The driving belt (not shown) is then shifted from the loose pulley $H'$ to the pulley $H^2$ setting in motion the sprocket gear $H^3$ and thereby the chain I in mesh with the sprocket wheel J at the opposite end of the machine. The upper section of the chain being driven to the left as indicated by the arrow, in turn drives the sprocket wheel K on the shaft $K'$ journaled in the traveling carriage, to the right. The clutch members $k$ and $k'$ (see Fig. 22) being engaged through the action of the lever R, the sprocket wheel $K^4$ is also driven to the right which connected by the chain $L^2$ with the sprocket wheel L on the stub shaft $L'$, drives the sprocket wheel L and spur gear M on the same shaft, to the right. The spur gear M meshing with the gear $M'$ on the shaft $C^4$, drives the latter to the left and also the plurality of twisting gears $C^5$ in mesh with the several gears E carried by and controlling the rotation of the respective arbors D which severally twist together the strands forming the lateral cables $B'$. The shaft $C^4$ turning to the left causes the pinion $T^2$ on the near side of the machine to turn to the left which being in mesh with the gear T, rotates the latter to the right until the cam S on the inner face of the gear riding under the roll $R'$ on the lever R, shifts the lever to the position occupied in Fig. 21, disengaging the clutch $k$, $k'$. The lever R is then operated manually to engage the clutch $k^2$, $k^3$, on the near side of the machine.

As the strands forming the lateral cables are being twisted together in the manner indicated, the carriage is simultaneously moved to the right as will now be explained. The sprocket wheel $M^2$ on the shaft $C^4$ turning to the left through the chain $n'$ drives the sprocket wheel $C^2$—loosely mounted on the shaft $O'$—to the left; the dogs $O^3$ carried by the sprocket wheel engaging the ratchet wheel $O^4$ keyed to the shaft $O'$, thereby rotating the shaft and the pinion P on the near side of the machine to the left. The pinion P meshing with the gear $P'$ on the shaft $P^2$, rotates the gear $P'$ and the gear $P^3$ carried by the shaft on the far side of the machine (see Fig. 30) to the right. The gears $P'$ and $P^3$ meshing respectively with the rack bars Q and $Q'$, move the twisting gear carriage to the right simultaneously with the twisting together of the strands forming the lateral cables. The strands being twisted together a predetermined distance, the operator takes a picket from the carrier $c$ and inserts it through the alined slots $d$ of the several arbors D. The lever $V'$ controlling the beater fingers $v$, is then operated; the several fingers contacting with the picket force it out of the slotted arbors into the crotch of the lateral cables formed by twisting together the strands of wire. Upon the operator releasing the lever $V'$, the spring $V^2$ forces the beater fingers back to their initial position ready for another picket. The lever R having been shifted from the neutral position—see Fig. 21—by a manual operation to the position indicated in Fig. 23, in which the clutch members, $k^2$, $k^3$, are interlocked, it will be seen that the gear $K^2$ loosely mounted on the shaft $K'$ and now locked therewith by means of the clutch mechanism, will be driven to the right by the sprocket gear K actuated by the chain I. The sprocket gear $K^2$ through the chain $K^3$, drives the sprocket gear $C^3$ on the shaft $C^4$ to the right. The shaft $C^4$ turning to the right actuates the spur gear $M'$ to the right and it, meshing with the spur gear M on the shaft $L'$, turns the latter to the left and also the sprocket wheel N keyed to the shaft. The sprocket wheel N through the chain $n$, drives the sprocket wheel O (which is loosely mounted on the shaft $O'$) to the left. The dogs $O^3$ pivoted to the sprocket wheel O engage the ratchet wheel $O^4$ keyed to the shaft $O'$, turning the latter to the left and with it the gear P on the near side of the machine, which in turn meshes with the gear $P'$ on the shaft $P^2$, turning them to the right,—the gears $P'$, $P^3$, meshing with the rack bars Q and $Q'$ causes the gear carriage to move to the right a predetermined distance in the manner previously explained. It will now be seen that the shaft $C^4$ on which the several twisting gears $C^5$ are mounted being actuated in the opposite direction to that just described, will reverse the gears E and the rotation of the arbors D, and thereby the direction of the twist given to the strands of the lateral cables between each picket. It will be noted that while the sprocket wheels O and $O^2$ are simultaneously operated, one only drives the ratchet wheel $O^4$ through the dogs carried by the then operating sprocket wheel, the dogs of the other sprocket wheel riding over the ratchet teeth to engage the ratchet wheel at every alternate operation. A picket is then taken from the carrier $c$, inserted in the slotted arbors, and forced from the arbors by the beaters $v$ into the crotch formed by the strands of the lateral cables as before explained. The shaft $C^4$ turning to the right causes the pinion $T^2$ to turn to the right which meshing with the gear T, turns the latter to the left, the adjustable cam S on the near side of the gear engaging the roll $R'$ of the lever R thereby disconnecting the clutch members $k^2$, $k^3$, again shifting the lever to neutral position—see Fig. 21—from which position it is again manually shifted to engage the clutch members $k$ and $k'$, completing the cycle of operation between two pickets,—it being noted that the direction given to the twist of the strands forming the cables is reversed upon the insertion of each picket. To provide for increasing or decreasing the space between pickets, the gear T is provided with a plurality of concentrically arranged apertures $t$ to receive the shank or bolt of the cams S, thus by spacing the cams on opposite sides of the gear wheel nearer to or farther apart, provision is made for throwing out of gear the clutch mechanisms $k$, $k'$, and $k^2$, $k^3$, at varying intervals and as will be obvious, thereby increasing or decreasing the length of the twisted portion separating the pickets.

When it is desired to form a fence having arched top pickets, as indicated in Fig. 17, the apertured end of the bar X is engaged with the hook $X^{10}$ at the far side of the machine, pickets of proper length inserted in the crotch of the wires as before explained, and the arched head $X'$ laid over the pickets as shown in Fig. 5,—the pickets extending through notches $X^3$ in the depending flange $X^2$ of the head. The end of the picket is then manually bent to the right and is engaged by the depending pin $X^8$ of the rod $X^4$. The lever $X^7$ is then operated bringing the picket around the arched head $X'$ as shown in Fig. 6, the end of the picket being engaged between the two upper lateral cables as the twisting of the strands progresses. A new picket is then inserted adjacent to the end of the arched top and the operation just described repeated. Upon the completion of the section of fence, the length of which is governed by the length of the machine, the completed fabric is bundled upon the winding drum G. To accomplish this result the lever $P^4$ is operated disengaging the pinion P from the gear $P'$;—the lever R is also shifted to a neutral position—see Fig. 21—i. e., both clutches $k$, $k'$ and $k^2$, $k^3$ being disengaged. The lever U is then turned to the right (see Fig. 2) releasing the dragging grip mechanism controlled by the levers $B^4$ and $B^{12}$. The clip $Z'$ is now engaged with one of the lateral wires and the bar Z of the twisting gear carriage, in order that when the fence fabric is wound upon the drum G the carriage will be automatically dragged back to its initial position in front of the winding drum. The lever $F^5$ is then operated to release the gripping rolls F, F, in order that the fabric may be drawn between the rolls on its way to the winding drum. The lever W is then operated by means of the tripping lever $W^4$ connected therewith,—this action engages the clutch members $h$, $h'$, on the driving shaft H, setting in operation the sprocket wheel $H^4$ and the sprocket $G^2$ on the shaft $G'$ supporting the winding drum G;—winding thereon the completed fence fabric at the same time dragging backward to its initial position, the twisting gear carriage hooked to one of the lateral wires by the device $Z'$. Upon the twisting gear carriage contacting with the tripper lever $W^4$—see dotted lines in Fig. 3—the lever $W^4$ will be forced backward and through the action of the members $W^3$ and $W^5$, will disengage the clutch members $h$, $h'$, thereby stopping the further rotation of the winding drum until the clutch is again manually engaged upon the completion of another section of fence. Before operating the gripping rolls to secure the lateral cables for the next section of fence to be formed, it is essential that the pickets of the completed fence section should be in alinement with the gripping rolls in order that the pickets entering into the construction of the new section be parallel with the old. This is particularly necessary when constructing a fence having an arched top for the reason that the arched top portion is apt to throw the lower portion of the pickets out of alinement as the upper or arched top edge of the fence "builds up" or increases in diameter on the winding drum more rapidly than the lower edge. To overcome this tendency, the operator before clamping the gripping rolls to the lateral cables, should see to it that the pickets of the completed section are in alinement with the gripping rolls. Having properly alined the pickets, the lever $F^5$ is again operated to grip the wires between the rolls F, F, and the lever U turned to the left as before to apply the dragging grip under control of the levers B⁴ and B¹². The lever P⁴ is operated to again bring into mesh the pinion P and gear P' to drive the carriage. The lever R is then thrown from the neutral position in Fig. 21 to either the position shown in Fig. 22 or 23, which again causes the twisting gears and the carriage upon which they are mounted to operate as previously explained.

Having thus described my invention, what I claim is:—

1. In a machine of the character described, means adapted to apply a locking grip to a plurality of relatively long strands of wire at one end, means for applying to the other end of said extended lengths of wire a dragging grip, means adapted to take up the slack of the several strands between the locking grip and dragging grip mechanism whereby the strands are put under tension, and means for twisting the strands into cables to engage a plurality of intersecting wires or pickets inserted between the several strands.

2. In a machine of the character described, means adapted to apply a locking grip to a plurality of relatively long strands of wire at one end, means for applying to the other end of said extended lengths of wire a dragging grip, means adapted to take up the slack of the several strands between the locking grip and dragging grip mechanism whereby the strands are put under tension, means for twisting the strands into cables to engage a plurality of intersecting wires or pickets inserted between the several strands, and means for bundling the finished product.

3. In a machine of the character described, a pair of rolls at one end of the machine having off-set portions adapted to apply a locking grip to a plurality of relatively long strands of wire at one of their ends, a pair of spaced rolls at the opposite end of the machine over which the strands are designed to be led, a swinging roll adapted to bear upon the strands between the spaced rolls to apply a dragging grip to the several wires, an auxiliary swinging roll adapted to bear upon the several strands to take up slack and to apply a tension to the wires between the locking rolls and those applying a dragging grip to the wires, and means for twisting the strands together to form a plurality of lateral cables engaging intersecting pickets inserted between the strands of the several cables.

4. In a machine of the character described, a frame, rack bars supported by the frame, a movable carriage, a shaft journaled in the carriage carrying gears in mesh with the rack bars, a driving shaft journaled in the frame at one end of the machine carrying a sprocket wheel, a driven sprocket wheel journaled in the frame at the opposite end of the machine, a driving chain connecting the driving and driven sprocket wheels, a train of gears journaled in the frame of the carriage driven by the driving chain adapted to drive the gears in mesh with the rack bars whereby the carriage is caused to travel.

5. In a machine of the character described, a frame, rack bars supported by the frame, a movable carriage, a shaft journaled in the carriage carrying gears in mesh with the rack bars, a plurality of slotted arbors journaled in laterally adjustable bearings each of which is provided with a gear, a shaft journaled in the frame carrying a plurality of gears in mesh with the gears carried by the several arbors, means for reversing the direction of rotation of the arbors, a driving shaft journaled in the frame at one end of the machine, a sprocket wheel mounted thereon, a driven sprocket wheel mounted at the opposite end of the machine, a driving chain connecting the driving and driven sprocket wheels, and a train of gears journaled in the frame of the carriage driven by the driving chain and adapted to mesh with the gears controlling the rotation of the arbors and the gears in mesh with the rack bars.

6. In a machine of the character described, a frame, rack bars supported by the frame, a movable carriage, trolley wheels journaled in said carriage adapted to traverse a track mounted on the frame, a shaft journaled in the carriage having gears in mesh with the rack bars, a driving shaft journaled in the frame at one end of the machine, a driven sprocket wheel journaled in the frame at the opposite end of the machine, a driving chain connecting the driving and driven sprocket wheels, a plurality of slotted arbors journaled in laterally adjustable bearings supported in the carriage, a train of gears adapted to simultaneously rotate said arbors in either direction, means for alternately reversing the direction of said arbors, said train of gears adapted to be actuated by the driving sprocket chain, and means for disconnecting the train of gears from the gears meshing with the rack bars.

7. In a machine of the character described, a frame, rack bars mounted on the frame, a movable carriage, a shaft journaled in the carriage carrying gears in mesh with the rack bars, a driving shaft journaled in the frame at one end of the machine carrying a driving sprocket wheel, a driven sprocket wheel journaled in the frame at the opposite end of the machine, a driving chain connecting the driving and driven sprocket wheels, a bundling drum journaled in the frame at one end of the machine, suitable gearing for driving said bundling drum actuated by a pinion mounted on the driving shaft, a clutch mechanism to release the bundling drum from its driven relation with the driving shaft, an upstanding arm controlling the clutch mechanism adapted to be actuated by the movable carriage on its return to its initial position, means for engaging the carriage with the lateral wires of the fence wound upon the bundling drum, whereby upon the winding of the fence upon the drum the carriage may be dragged back to its initial position and the clutch mechanism controlling the operation of the winding drum be thereby thrown out of gear.

8. In a machine of the character described, a frame, rack bars mounted on the frame, a movable carriage, a shaft journaled in the carriage carrying gears in mesh with the rack bars, a driving shaft journaled in the frame at one end of the machine carrying a driving sprocket wheel, a driven sprocket wheel journaled in the frame at the opposite end of the machine, a driving chain connecting the driving and driven sprocket wheels, a plurality of arbors journaled in the carriage adapted to twist together the strands forming the lateral cables of the fence, a train of gears journaled in the frame of the carriage driven by the driving chain adapted to drive the gears in mesh with the rack bars and to actuate the arbors, and means for reversing the direction of rotation of said arbors.

9. In a machine of the character described, a frame, rack bars mounted on the frame, a movable carriage, a shaft journaled in the carriage carrying gears in mesh with the rack bars, a driving shaft journaled in the frame at one end of the machine carrying a driving sprocket wheel, a driven sprocket wheel journaled in the frame at the opposite end of the machine, a driving chain connecting the driving and driven sprocket wheels, a plurality of arbors journaled in the carriage adapted to twist together the strands forming the lateral cables of the fence, a train of gears journaled in the frame of the carriage driven by the driving chain adapted to drive the gears in mesh with the rack bars and to actuate the arbors, means for reversing the direction of rotation of said arbors, a cross-member connected to the carriage frame at one side and provided at the other end with an arc-shaped head slotted for the passage of pickets, means carried by said head adapted to engage the end of the picket to bend it to conform to the shape of the head, and a lever for manually actuating said picket engaging means.

10. In a machine of the character described, a pair of rock shafts journaled in the frame of the machine at one end, each of which is provided with a longitudinal rib, said ribs being adapted to be forced into interlocking relation when said shafts are rotated to provide a locking grip on a plurality of wires threaded between said shafts, and means at the opposite end of the machine adapted to apply a dragging grip to the plurality of wires.

11. In a machine of the character described, a pair of rock shafts journaled in the frame of the machine at one end, each of which is provided with a longitudinal rib, said ribs being adapted to be forced into an interlocking relation when said shafts are rotated to provide a locking grip on a plurality of wires threaded between said shafts, a pair of spaced rolls journaled in the opposite end of the machine over which said wires are led, a rocking roll adapted to bear upon said wires between the spaced rolls to apply a dragging grip, and an auxiliary rocking roll engaging the wires between the locking grip and the dragging grip mechanism.

12. In a machine of the character described, a pair of rock shafts journaled in the frame of the machine at one end each provided with a longitudinal rib adapted to apply a locking grip on a plurality of wires threaded between said shafts, said shafts geared together for simultaneous operation, a rocking lever for actuating said shafts, means for applying a dragging grip to the wires at the opposite end of the machine comprising a pair of spaced rolls, a swinging shaft carried by rocker arms adapted to bear upon the wires between said rolls, a manually operated lever and yielding connection between the same and the rocker arm of the swinging shaft, an auxiliary swinging shaft carried by rocker arms journaled in the frame adapted to bear upon the wires between said locking and dragging grip mechanism, and a flexible connection between one of the rocker arms carrying the auxiliary shaft and the manually operated lever.

In testimony whereof, I sign this specification in the presence of two witnesses.

JOHN S. BARNES.

Witnesses:
 GRACE E. WYNKOOP,
 SAMUEL E. THOMAS.